(12) United States Patent
Le et al.

(10) Patent No.: US 7,054,559 B1
(45) Date of Patent: *May 30, 2006

(54) METHOD AND SYSTEM FOR MODULAR MULTIPLEXING AND AMPLIFICATION IN A MULTI-CHANNEL PLAN

(75) Inventors: Viet Le, Plano, TX (US); Xiaoping Mao, Plano, TX (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,461

(22) Filed: Sep. 4, 1997

(51) Int. Cl.
  *H04J 14/02* (2006.01)
  *H04B 10/12* (2006.01)

(52) U.S. Cl. .............................. 398/79; 398/81; 398/82; 398/147; 398/148

(58) Field of Classification Search ................ 359/127, 359/174, 179, 341, 124, 130, 123, 337.12, 359/341.2
See application file for complete search history.

(56) References Cited

U.S. PATENT DOCUMENTS

| | | | |
|---|---|---|---|
| 4,936,679 A | 6/1990 | Mersch | 356/41 |
| 5,005,936 A | 4/1991 | Hsu | 385/24 |
| 5,140,655 A | 8/1992 | Bergmann | 385/46 |
| 5,272,513 A | 12/1993 | Vahala | 356/28.5 |
| 5,321,541 A | 6/1994 | Cohen | 359/127 |
| 5,361,319 A | 11/1994 | Antos et al. | 385/123 |

(Continued)

FOREIGN PATENT DOCUMENTS

| | | |
|---|---|---|
| EP | 0 543 570 A2 | 5/1993 |
| EP | 0 724 314 A1 | 7/1996 |
| WO | WO 95/24065 | 9/1995 |

OTHER PUBLICATIONS

Agrawal, Govind P., "Fiber–Optic Communication Systems," John Wiley & Sons, Inc., 1992, pp. 272–292.

(Continued)

*Primary Examiner*—M. R. Sedighian (57) ABSTRACT

A system and method for modular multiplexing and amplification of optical signals in subwindows within an operating window of a fiber optic communication network. An operating window is divided into subwindows. Optical signals in each subwindow are optically amplified separately and in parallel by a plurality of optical line amplifiers. According to one embodiment, the operating window is divided into four subwindows within an erbium wavelength band. Each subwindow corresponds to a different group of channels having optical signals of a different wavelength. Modular wavelength division multiplexing (WDM) units multiplex/demultiplex optical signals in the set of multiple channels. A modular WDM unit includes a coarse WDM unit and four fine WDM units. The coarse WDM multiplexes optical signals by wavelength into subwindows separated by relatively large guard bands. A fine WDM unit further multiplexes optical signals within a subwindow by wavelength into individual channels with a fine separation. Fine WDM units and optical line amplifiers can be added in a modular fashion, as needed, to support actual or anticipated traffic in the corresponding subwindows and channels therefor. Dispersion magnitude and slope can be managed across channels within subwindows without expensive equalization circuits. A multi-channel plan for high-speed WDM traffic in an erbium band can be adopted and installed in a modular fashion on existing single-mode fiber networks with less initial cost and more flexible design.

2 Claims, 4 Drawing Sheets

U.S. PATENT DOCUMENTS

| | | | | |
|---|---|---|---|---|
| 5,430,568 A | * | 7/1995 | Little et al. | 359/124 |
| 5,438,444 A | | 8/1995 | Tayonaka et al. | 359/123 |
| 5,452,116 A | * | 9/1995 | Kirkby et al. | 359/124 |
| 5,452,124 A | * | 9/1995 | Baker | 359/341 |
| 5,546,210 A | * | 8/1996 | Chraplyvy et al. | 359/124 |
| 5,550,666 A | * | 8/1996 | Zirngibl | 359/125 |
| 5,613,027 A | | 3/1997 | Bhagavatula | 385/123 |
| 5,633,741 A | * | 5/1997 | Giles | 359/124 |
| 5,652,814 A | * | 7/1997 | Pan et al. | 385/24 |
| 5,748,350 A | * | 5/1998 | Pan et al. | 359/130 |
| 5,786,918 A | * | 7/1998 | Suzuki et al. | 359/135 |
| 5,801,858 A | * | 9/1998 | Roberts et al. | 359/114 |
| 5,831,754 A | * | 11/1998 | Nakano | 359/161 |
| 5,841,557 A | * | 11/1998 | Otsuka et al. | 359/122 |
| 5,886,804 A | * | 3/1999 | Onaka et al. | 359/161 |
| 5,907,420 A | * | 5/1999 | Chraplyvy et al. | 359/179 |
| 5,909,295 A | * | 6/1999 | Li et al. | 359/130 |
| 5,914,794 A | * | 6/1999 | Fee et al. | 359/110 |
| 5,938,309 A | * | 8/1999 | Taylor | 357/124 |
| 5,946,117 A | * | 8/1999 | Meli et al. | 359/124 |
| 5,949,563 A | * | 9/1999 | Takada | 359/124 |
| 5,959,767 A | * | 9/1999 | Fatehi et al. | 359/341 |
| 6,041,152 A | * | 3/2000 | Clark | 385/24 |
| 6,137,604 A | * | 10/2000 | Bergano | 359/124 |

OTHER PUBLICATIONS

Press Release, URL address: http://www.corningfiber.com/press2-17-97.htm, "Corning Incorporated Announces Sale of Millionth Kilometer of Corning® SMF–LS Fiber," one page, Feb. 17, 1997.

Seikai, S. et al., "Novel Optical Circuit Suitable for Wavelength Division Bidirectional Optical Amplification," *Electronic Letters*, vol. 29, no 14, Jul. 8, 1993, pp. 1268–1270, XP000322267.

Fukui, M. et al., "10 channel x 10 gbit/s WDM add/drop multiplexing/transmission experiment of 240 km of dispersion–shifted fibre employing unequally–spaced arrayed-waveguide–grating ADM filter with fold–back configuration," *Electronic Letters*, vol. 31, No. 20, Sep. 28, 1995, pp. 1757–1759, XP00038092.

Chawki, M.J. et al., "Wavelength reuse in a WDM unidirectional ring network by using a fiber–grating add/drop multiplexer," *Optical Fiber Communication: Summaries of Papers Presented at the Conference OFC 1995*, San Diego, Feb. 26 –Mar. 3, 1995, vol. 8, Feb. 26, 1995, IEEE, pp. 272–273, XP000517704.

Su, S.F. et al., "Use of Acoustic Tunable Filters as Equalizers in WDM Lightwave Systems," *Proceedings of the Optical Fiber Communication Conference*, San Jose, Feb. 2–7, 1992, No. Conf. 15, Feb. 2, 1992, IEEE, pp. 203–204, XP000341678.

* cited by examiner-

METHOD AND SYSTEM FOR MODULAR MULTIPLEXING AND AMPLIFICATION IN A MULTI-CHANNEL PLAN

BACKGROUND OF THE INVENTION

1. Field of the Invention

The present invention relates to fiber optic networks and multi-channel communication systems.

2. Related Art

Modern communication systems increasingly rely upon fiber optic networks to carry increasing amounts of data between sites. The use of multiple optical carriers, also called channels, over the same optical fiber increases capacity. Wavelength division multiplexing (WDM) allows multiple channels to be carried on a fiber in different carrier wavelengths. Attenuation and dispersion in an optical fiber limit the distance an optical signal can travel without amplification and/or dispersion compensation. Accordingly, optical line amplifiers are provided along a fiber link to amplify an optical signal. Dispersion compensation is used to ameliorate dispersion limitations.

Figure 1:
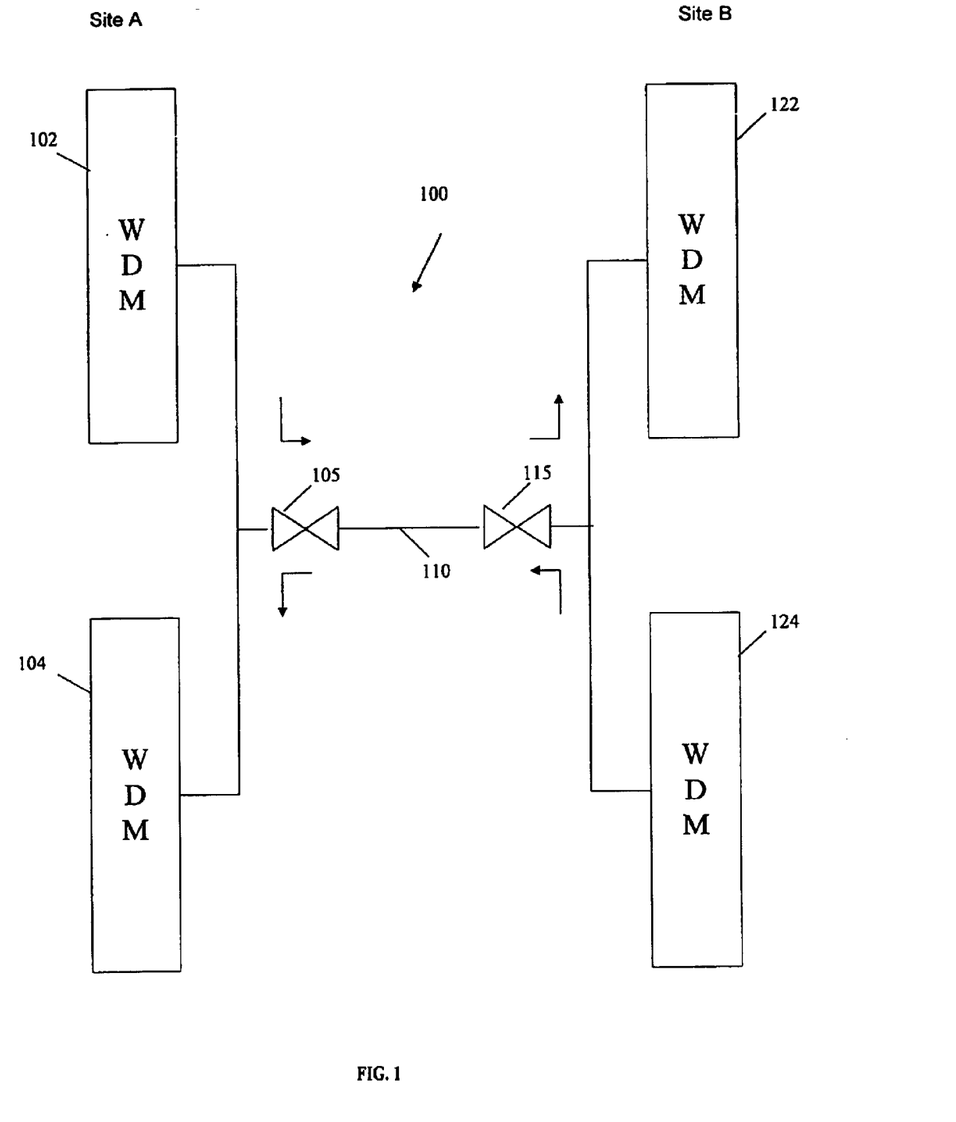
FIG. 1 shows a diagram of a conventional wavelength division multiplexing optical communications network with an optical line amplifier.

FIG. 1 shows an example of a fiber optic link 100 for carrying wavelength division multiplexed optical signals between site A and site B. Site A includes wavelength division multiplexers 102, 104 optically coupled to an optical fiber 110. Site B includes wavelength division multiplex units 122, 124 optically coupled to optical fiber 110. Optical fiber 110 includes two optical line amplifiers 105, 115 coupled in series to support bi-directional optical communication over the optical fiber 110.

In multi-channel communication systems, the term "operating window" refers to a band of channels supported by an optical communication network. A channel plan defines specific wavelengths assigned to each channel within an operating window. In a long-distance fiber optic network, the operating window is dependent upon the characteristics and performance of fiber amplifiers provided along a high-speed optical link. For example, one operating window for an erbium-doped fiber amplifier covers a range of wavelengths between approximately 1530 to 1561 nanometers (nm). Wavelength division multiplexed optical signals within this erbium band are amplified by a single erbium-doped fiber amplifier.

In practice, spacing must be provided between channels within an erbium band to maintain signal separation and quality. According to one International Telecommunication Union (ITU) standard, a 100 Gigahertz (GHz) spacing is provided between channels. This 100 GHz spacing translates to a wavelength range of approximately 0.8 nm, meaning only 36 or 37 WDM channels fit within an erbium fiber band. However, if each optical carrier is modulated at high data bit rates, such as 10 Giga-bits/second (Gb/s), a 200 GHz spacing is required between channels to avoid crosstalk. As a result, only sixteen channels with 200 GHz spacing can be used effectively in an operating window within an erbium band of approximately 1530 to 1561 nm.

Proposed WDM channel plans consist of 2, 4, 8 and 16 wavelength channel plans within the erbium band. For maximum capacity, it is desirable to use a 16 wavelength channel plan. Using a 16-channel wavelength division multiplexing plan requires that an erbium-doped fiber amplifier amplify across 16 channels. Problems are encountered with respect to amplification, equalization, nonlinear interference, receiver selectivity, and transmitter stability when a crowded 16-channel plan is squeezed through a single erbium-doped fiber amplifier.

In general, erbium-doped fiber amplifier gain is not even across the erbium band. A peak exists at or near 1532 nm. In other words, erbium-doped fiber amplifier gain across an operating window is not equal for all WDM channels. Power equalization circuits can be provided to equalize gain for each WDM channel. See, the patent application by X. Mao, "Multiple Wavelength Bidirectional Lightwave Amplifier," filed Dec. 29, 1995, application Ser. No. 08/581,746 (now pending). Power equalization circuits, however, can be complex and expensive.

Amplifying multiple channels in a single erbium-doped fiber amplifier further reduces the relative output signal power for each channel. For example, an erbium-doped fiber amplifier has a maximum pump power limited by present semiconductor technology to approximately 60–130 milliwatts. The conversion efficiency between pump power and actual signal output power within an erbium band is approximately 20%. Thus, a 100 milliwatt pump power results in a total amplifier output power of approximately 20 milliwatts. If the erbium-doped fiber amplifier must support 16 channels, output signal power is distributed across each channel and reduced to about 1.3 milliwatts per channel. A low power pump source cannot even be used.

Further, conventional multi-channel WDM systems cannot be efficiently scaled to accommodate greater numbers of channels as traffic demand increases. High port count fine WDM transmitters and receivers must be installed at the outset. Incurring such an expense can be undesirable especially if current traffic demands only require a few channels. For example, installing a 16 port fine WDM transmitter and receiver to support 16 channels in an erbium band is expensive and difficult to design. Heretofore, a 16×16 port fine WDM transmitter/receiver would be required to support conventional 16 channel plans even if all 16 channels are not used initially.

Dispersion further limits the ability of a single optical fiber to support an operating window. Three types of single-mode optical fiber are commonly used in optical fiber networks: non-dispersion-shifted (NDS) fiber, zero-dispersion-shifted fiber, and low slope dispersion-shifted fiber. A non-dispersion-shifted (NDS) fiber, such as a fiber complying with the ITU G.652 standard, is only non-dispersive at the zero point which lies outside the erbium band. Zero-dispersion shifted fiber, such as a fiber complying with the ITU G.653 standard, can shift the zero-point to within erbium band but cannot remove dispersion across 16 channels in an erbium band. When 16 wavelengths are carried over a zero-dispersion shifted fiber, non-linear effects such as four-wave mixing, result in mixing products and sidebands which diminish signal quality. Thus, to get a capacity increase over a G.653 zero-dispersion shifted fiber, conventional WDM communication requires careful wavelength selection and isolation between channel directions. This limits the ability of a zero-dispersion shifted fiber to effectively support bi-directional communication over 16 WDM channels in an erbium band. Low slope dispersion shifted fiber, such as the SMF-LS fiber announced by Corning, is purported to support an erbium bandwidth with less dispersion. Low slope dispersion shifted fibers are relatively new overall in long-distance links.

A dispersion compensation module (DCM) is often provided at an optical amplifier to manage dispersion. For example, a segment of single-mode G.652 fiber has a huge dispersion on the order of 17 picoseconds/nm-kilometer at 1550 nm. Given such dispersion, transmitters can only send optical signals for up to 60 kilometers (km.) in a G.652 fiber before the dispersion prevents the optical signals from being discriminated. Dispersion problems are exacerbated when an operating window has multiple channels as in a 16-channel erbium band operating window. A dispersion compensating device compensates for absolute or bulk dispersion (magnitude). Conventional dispersion management at a single fiber amplifier, however, does not effectively control the slope or variation of dispersion across an operating window.

What is needed is an apparatus and method for optically amplifying multiple channels across an operating window that provides a relatively flat optical gain curve. Dispersion needs to be managed across an operating window, especially for a multiple channel erbium band carrying high-speed WDM optical signals. Cheaper optical fiber types, including fibers on installed networks, need to be accommodated for a multiple channel erbium band carrying high-speed WDM optical signals. The ability to use low power pump sources for a multiple channel erbium band carrying high-speed WDM optical signals is also desirable. The ability to efficiently scale a fiber network in a modular fashion to increase capacity and accommodate increasing numbers of channels for a multiple channel erbium band carrying high-speed WDM optical signals is needed.

SUMMARY OF THE INVENTION

A system and method for modular multiplexing and amplification of optical signals in a set of multiple channels in an operating window of a fiber optic communication network is provided. According to the present invention, an operating window is divided into subwindows. Optical signals in each subwindow are optically amplified separately and in parallel by a plurality of optical line amplifiers. Dispersion compensation modules allow dispersion in each subwindow to be controlled separately.

According to one embodiment, the operating window covers an erbium band of infra-red wavelengths between approximately 1530 and 1561 nanometers (nm). The operating window is divided into four subwindows within the erbium band. The four subwindows include four different respective groups of optical signals within the erbium band.

According to one preferred example of the present invention, a first group of channels has optical signals in a first range of wavelengths between approximately 1530 to 1536 nm. A second group of channels has optical signals in a second range of wavelengths between approximately 1538 to 1543 nm. A third group of channels has optical signals in a third range of wavelengths between approximately 1547 to 1553 nm. A fourth group of channels has optical signals in a fourth range of wavelengths between approximately 1555 to 1561 nm.

In one embodiment, the set of multiple channels in the operating window has sixteen channels (channels 1 to 16). First, second, third and fourth groups of channels then each have four channels. In one preferred example, first to sixteenth channels support respective optical signals having the following approximate wavelengths:

| Channel No. | Approximate Wavelength (nm) |
|---|---|
| 1 | 1530.33 |
| 2 | 1531.90 |
| 3 | 1533.47 |
| 4 | 1535.04 |
| 5 | 1538.19 |
| 6 | 1539.77 |
| 7 | 1541.35 |
| 8 | 1542.94 |
| 9 | 1547.72 |
| 10 | 1549.32 |
| 11 | 1550.92 |
| 12 | 1552.52 |
| 13 | 1555.75 |
| 14 | 1557.36 |
| 15 | 1558.98 |
| 16 | 1560.61 |

According to an embodiment of the present invention, first and second modular wavelength division multiplexing (WDM) units are provided at different sites linked by optical fibers. The optical fibers are arranged in parallel optical paths between the first and second multiplexing units. Optical line amplifiers are disposed along the optical fibers to amplify subgroups of optical signals corresponding to the subwindows within the operating window. In one example implementation, each optical line amplifier includes two erbium-doped fiber amplifiers connected in series with a dispersion compensation module.

Uni-directional traffic and/or bi-directional traffic is supported between the first and second sites along the same fiber. In one preferred implementation that minimizes crosstalk and eases WDM design for a 16 channel plan within an erbium band, the first and third subwindows support uni-directional traffic in one direction, while the second and fourth subwindows support unidirectional traffic in an opposite direction.

According to one embodiment of the present invention, a WDM unit divides the optical signals in the set of multiple channels into first, second, third, and fourth subgroups of optical signals depending upon wavelength in corresponding first, second, third, and fourth subwindows within the operating window. For a four-subwindow plan, each WDM unit includes one coarse WDM unit and four fine WDM units. A first coarse wavelength division multiplexing unit divides the optical signals in the set of multiple channels into first, second, third, and fourth subgroups of optical signals depending upon wavelength in corresponding first, second, third, and fourth subwindows within the operating window. First, second, third, and fourth fine wavelength division multiplexing units are each optically coupled in parallel between the first coarse wavelength division multiplexing unit and a plurality of optical amplifiers. The first, second, third, and fourth fine wavelength division multiplexing units further divide respective first, second, third, and fourth subgroups of optical signals by wavelength into individual channels within corresponding first, second, third, and fourth subwindows.

According to the present invention, a multi-channel plan for high-speed WDM traffic in an erbium band can be adopted and installed in a modular fashion on existing single-mode fiber networks with less initial cost and more flexible design. A coarse WDM unit is added up front to multiplex optical signals into subwindows. The coarse WDM only multiplexes/demultiplexes optical signals into subwindows separated by relatively large guard bands, and not into individual channels with a fine separation. This makes the coarse WDM relatively easy to design and inexpensive as the coarse WDM has a lower number of ports equal to the number of subwindows (not the number of channels) and a greater separation between wavelengths. Fine WDM units can be added in a modular fashion as subwindows in the multi-channel plan are required to support actual or anticipated traffic demand.

Effective dispersion management of dispersion magnitude and slope across multiple channels of an operating window without expensive equalization circuits is another advantage of the modular multiplexing and amplification system of the present invention. Because the present invention provides greater dispersion management, cheaper optical fiber types, including single-mode, dispersive fibers on installed networks, and low pump power sources can be used to support a multiple channel erbium band carrying high-speed WDM optical signals.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

The present invention will now be described with reference to the accompanying drawings. In the drawings, like reference numbers indicate identical or functionally similar elements.

DETAILED DESCRIPTION OF THE PREFERRED EMBODIMENTS

A system and method for modular multiplexing and amplification of optical signals in subwindows within an operating window of a fiber optic communication network is provided. According to the present invention, an operating window for a multi-channel plan is divided into subwindows. Optical signals in each subwindow are optically amplified separately and in parallel by a plurality of optical line amplifiers.

The present invention is described in the example environment of a fiber optic communication network. Description in these terms is provided for convenience only. It is not intended that the invention be limited to application in this example environment. In fact, after reading the following description, it will become apparent to a person skilled in the relevant art how to implement the invention in alternative environments.

Figure 2:
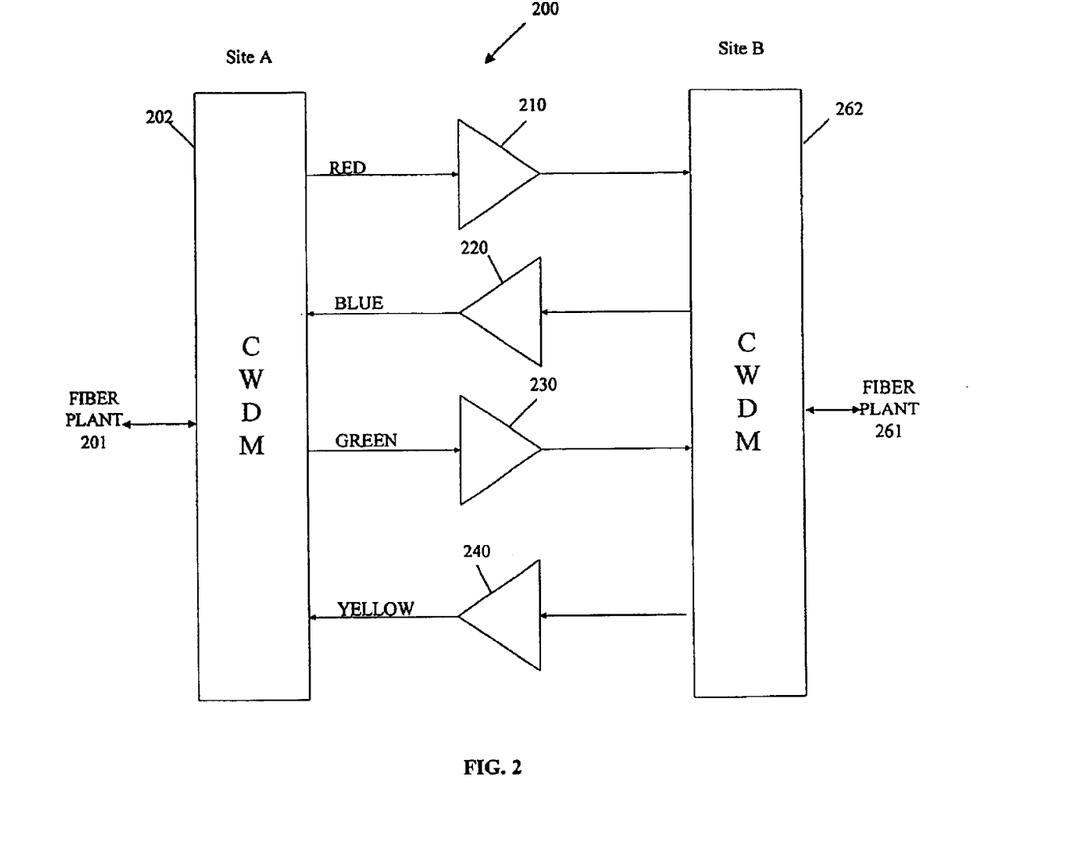
FIG. 2 is a diagram of a modular multiplexing and amplification system according to one embodiment of the present invention.

FIG. 2 is a diagram of a modular multiplexing and amplifier system 200 according to one embodiment of the present invention. First and second modular multiplexing units 202, 262 are provided at sites A, B within a fiber optic communication network. First multiplexing unit 202 is optically coupled to fiber plant 201. Second multiplexing unit 262 is optically coupled to fiber plant 261. Fiber plants 201, 261 represent other areas of the fiber optic communication network.

A plurality of optical line amplifiers 210, 220, 230, 240 are disposed along parallel optical fibers (not shown) that carry optical traffic between first and second multiplexing units 202, 262. Optical line amplifiers 210, 220, 230, 240 amplify four respective subgroups of optical signals corresponding to four subwindows within the erbium band operating window. The four groups of optical signals are referred to herein as "red", "blue", "green", and "yellow" optical signals for notational convenience only to help delineate the four different groups within the erbium band.

As shown in FIG. 2, in one preferred implementation that minimizes cross-talk and eases WDM design for a 16 channel plan within an erbium band, the first and third subwindows support uni-directional traffic of red and green optical signals in one direction, while the second and fourth subwindows support uni-directional traffic of blue and yellow optical signals in an opposite direction. The present invention, however, is not intended to be so limited. As would be apparent to a person skilled in the art given this description, uni-directional traffic and/or bi-directional traffic can be supported on each path or fiber between sites A and B. Intermediate sites, equipment, fibers, line components, and switches (not shown) can also be provided between sites A and B.

Each optical line amplifier 210–240 can include any type of optical amplifier, regenerator, or repeater including, but not limited to, an erbium-doped fiber amplifier and a fluoride-doped fiber amplifier.

Figure 3:
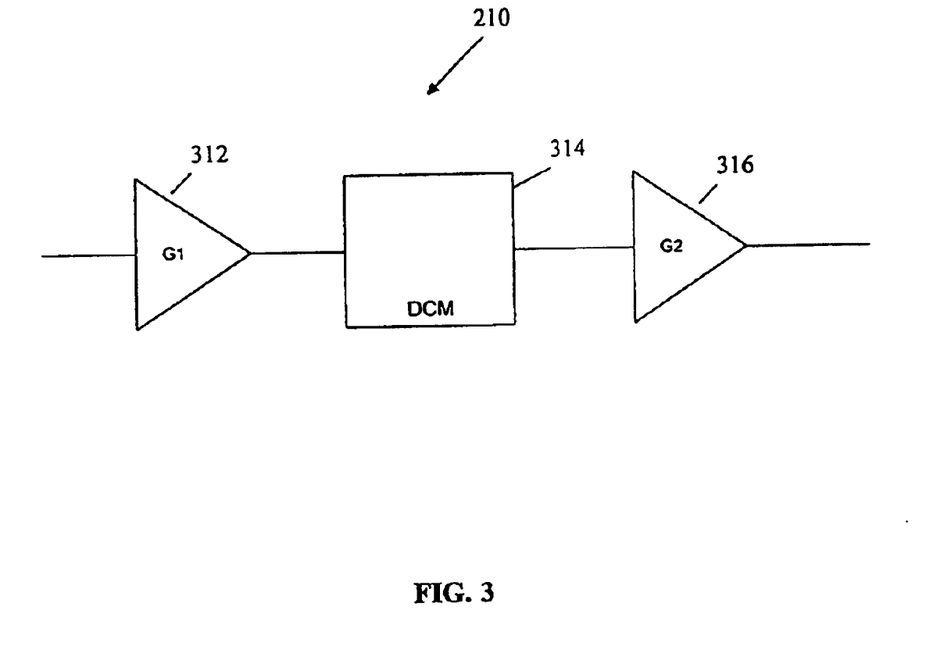
FIG. 3 is a diagram of an example optical line amplifier according to the present invention.

FIG. 3 is a diagram of an optical line amplifier 210 according to one preferred example of the present invention. Optical line amplifier 210 includes a first erbium-doped fiber amplifier 312 having a gain G1, a dispersion compensation module (DCM) 314, and second erbium-doped fiber amplifier 316 having a gain G2 connected in series. First and second erbium-doped fiber amplifiers 312, 316 are preferably driven by, but are not limited to, low power pump sources (not shown).

For example, low power pump sources, also called small pump sources, can have a pump power of less than approximately 130 milliwatts and a conversion efficiency to signal output power equal to or less than approximately 20%. Dispersion compensation module (DCM) 314 can be any well-known dispersion compensation module (DCM), including but not limited to, a dispersion compensation module that compensates for an absolute magnitude of dispersion and/or a change in dispersion slope. Because of the modular design, each DCM 314 can be adjusted individually to compensate for dispersion within a particular subwindow. In this way, optical gain can be made approximately equal across all channels in the operating window by managing each individual optical line amplifier gain for a subwindow separately.

Because the modular optical line amplifiers 210–240 only cover four channels in each subwindow and allow separate management of dispersion in subwindows across the operating window, optical fibers between sites A and B can be selected from the following types of single-mode optical fiber: dispersion-shifted optical fiber, zero-dispersion shifted optical fiber, and low slope dispersion-shifted optical fiber.

Of course, the present invention is not limited to single-mode optical fiber, and in general, can be used with any type of optical fiber, such as, multi-mode fiber.

According to one embodiment, the operating window covers an erbium band of wavelengths between approximately 1530 nm and 1561 nm. The operating window is divided into four subwindows for red, blue, green, and yellow optical signals within the erbium band. Optical line amplifiers 210, 220, 230, 240 amplify respective subgroups of red, blue, green, and yellow optical signals corresponding to four subwindows within the erbium band operating window.

According to one preferred example of the present invention, modular multiplexing units 202, 262 each multiplex the optical signals in a set of 16 multiple channels into first, second, third, and fourth subgroups of optical signals depending upon wavelength in corresponding first, second, third, and fourth subwindows within the operating window. As would be apparent to a person skilled in the art, the term "multiplex" or WDM, is used herein to include multiplexing and/or demultiplexing depending upon traffic direction. Thus, in general, first multiplexing unit 202 and second multiplexing unit 262, can be any type of wavelength division multiplexing/de-multiplexing system.

The first subwindow corresponds to a first group of channels having red optical signals. The second subwindow corresponds to a second group of channels having blue optical signals. The third subwindow corresponds to a third group of channels having green optical signals. The fourth subwindow corresponds to a fourth group of channels having yellow optical signals.

The first group of channels having red optical signals comprises channels in a first range of wavelengths between approximately 1530 to 1536 nm. The second group of channels having blue optical signals comprise channels in a second range of wavelengths between approximately 1538 to 1543 nm. The third group of channels having green optical signals comprises channels in a third range of wavelengths between approximately 1547 to 1553 nm. The fourth group of channels having yellow optical signals comprises channels in a fourth range of wavelengths between approximately 1555 to 1561 nm.

The set of multiple channels in the operating window has sixteen channels (channels 1 to 16). First, second, third and fourth groups of channels then each have four channels. In one example, the first to sixteenth channels support respective optical signals having the following approximate wavelengths:

TABLE

| Channel No. | Approximate Wavelength (nm) |
|---|---|
| 1 | 1530.33 |
| 2 | 1531.90 |
| 3 | 1533.47 |
| 4 | 1535.04 |
| 5 | 1538.19 |
| 6 | 1539.77 |
| 7 | 1541.35 |
| 8 | 1542.94 |
| 9 | 1547.72 |
| 10 | 1549.32 |
| 11 | 1550.92 |
| 12 | 1552.52 |
| 13 | 1555.75 |
| 14 | 1557.36 |
| 15 | 1553.98 |
| 16 | 1560.61 |

Figure 4:
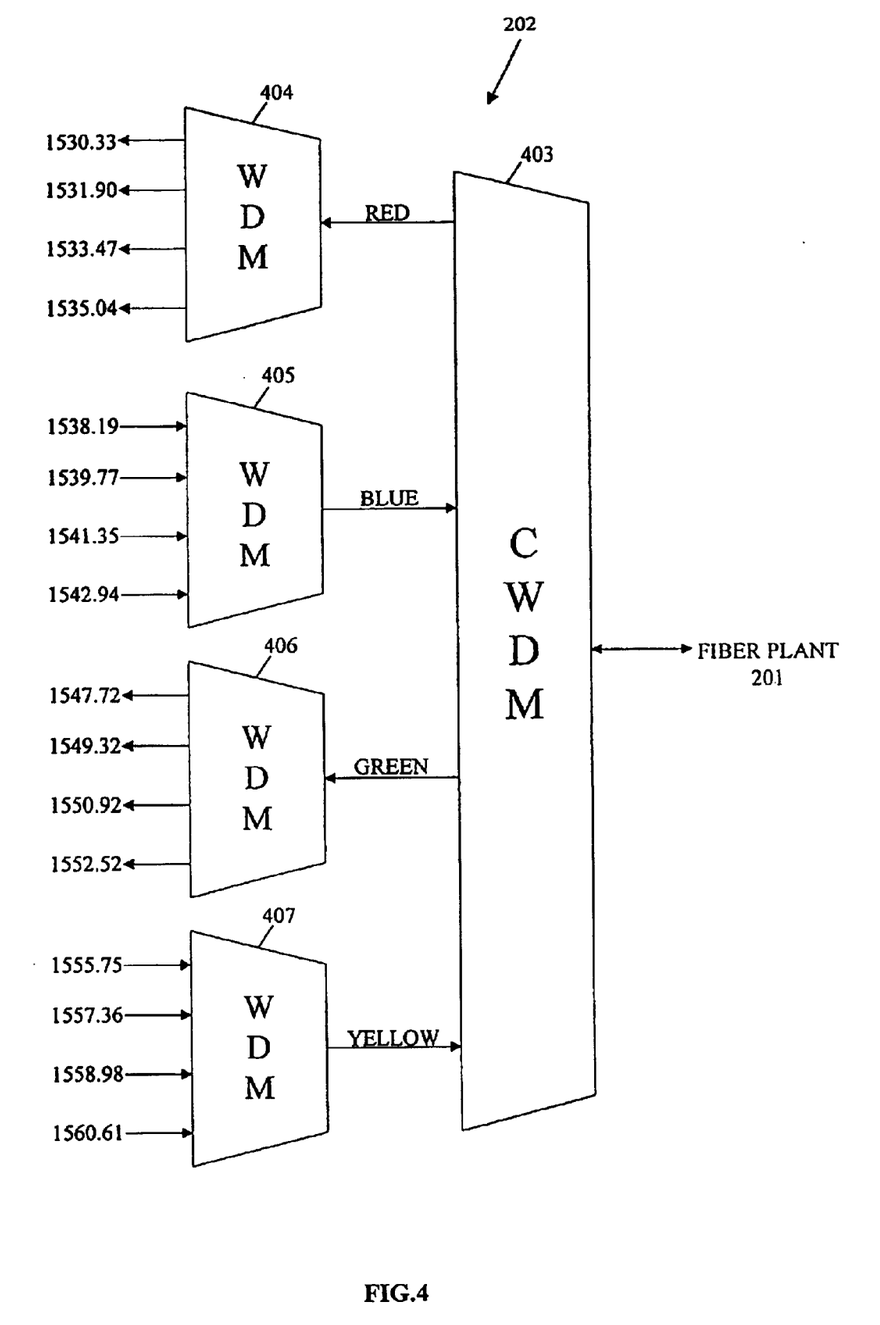
FIG. 4 is a diagram of an example modular coarse wavelength division multiplexing system according to the present invention.

According to a further embodiment of the present invention, first multiplexing unit 202 and second multiplexing unit 262, comprise a modular coarse wavelength division multiplexing/de-multiplexing system. FIG. 4 shows an example modular multiplexing unit 202 having a coarse wavelength division multiplexing (CWDM) unit 403 and four fine wavelength division multiplexing (WDM) units 404–407. "Coarse" wavelength division multiplexing, as used herein, refers to multiplexing/demultiplexing optical signals into subwindows depending upon wavelength. "Fine" wavelength division multiplexing, as used herein, refers to multiplexing/demultiplexing optical signals into individual channels within subwindows depending upon wavelength.

According to one preferred embodiment of the present invention, CWDM unit 403 divides the optical signals in the set of multiple channels into first, second, third, and fourth subgroups of optical signals depending upon wavelength in corresponding first, second, third, and fourth subwindows within the operating window. Fine WDM units 404–407 are each optically coupled in parallel between CWDM unit 403 and respective optical amplifiers 210–240 (not shown in FIG. 4). The four fine WDM units 404–407 further divide first, second, third, and fourth subgroups of optical signals by wavelength into channels for carrying optical signals having different wavelengths within corresponding first, second, third, and fourth subwindows.

In one example, CWDM unit 403 divides the optical signals in a set of 16 multiple channels into first, second, third, and fourth subgroups of optical signals depending upon wavelength in corresponding first, second, third, and fourth subwindows within the operating window. As shown in FIG. 4, the first subwindow corresponds to a first group of four channels having red optical signals. The second subwindow corresponds to a second group of four channels having blue optical signals. The third subwindow corresponds to a third group of four channels having green optical signals. The fourth subwindow corresponds to a fourth group of four channels having yellow optical signals.

Fine wavelength division multiplexing unit 404 further divides the first subgroup of red optical signals by wavelength into channels 1 to 4 as described in the above Table. Fine wavelength division multiplexing unit 405 further divides the second subgroup of blue optical signals by wavelength into channels 5 to 8 as described in the above Table. Fine wavelength division multiplexing unit 406 further divides the third subgroup of green optical signals by wavelength into channels 9 to 12 as described in the above Table. Fine wavelength division multiplexing unit 407 further divides the fourth subgroup of yellow optical signals by wavelength into channels 13 to 16 as described in the above Table.

A modular multiplexing and amplification system has been described primarily with respect to a four subwindow plan covering 16 channels in an erbium band. The present invention, however, is not intended to be so limited. In general, any number of channels and subwindows can be used. The operating window can include any range of wavelengths (or frequencies). For example, the operation window can extend further from 1520 to 1560 nm and any number of subwindows (e.g. 4–6 subwindows) can be used according to the present invention.

The modular multiplexing and amplification system of the present invention is scalable in that fine WDM units 404–407 and amplifiers 210–240 can be added, as needed, to support actual or anticipated traffic in the corresponding subwindows and channels therefor. Dispersion management of dispersion magnitude and slope across multiple channels of an operating window is attained without expensive equalization circuits. Inexpensive, dispersive single-mode optical fibers and low power pump sources can be used to support a multiple channel erbium band carrying high-speed WDM optical signals in a fiber network.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for equalizing optical gain across a set of channels within an operating window of a fiber communication network, comprising:

a coarse wavelength division multiplexing/demultiplexing unit configured to support bi-directional optical signal traffic within the operating window, the operating window comprising a first set of subwindows traveling in a first direction and a second set of subwindows traveling in a second direction, the first set of subwindows comprising different channels of the set of channels than the second set of subwindows, wherein each subwindow of the first and second set of subwindows comprises a plurality of channels from the set of channels;

a plurality of fine wavelength division multiplexers configured to support uni-directional traffic comprising the first set of subwindows;

a plurality of fine wavelength division demultiplexers configured to support uni-directional traffic comprising the second set of subwindows;

a first plurality of optical line amplifiers, each of the first plurality of optical line amplifiers configured to amplify a different respective subwindow of the first set of subwindows traveling in the first direction; and a second plurality of optical line amplifiers, each of the second plurality of optical line amplifiers configured to amplify a different respective subwindow of the second set of subwindows traveling in the second direction, wherein the first and second plurality of optical line amplifiers are configured to substantially equalize gain across the set of channels within the operating window.

2. The system of claim 1, wherein the first direction is opposite the second direction.

* * * * *